United States Patent
Loiacono et al.

(10) Patent No.: US 7,916,659 B2
(45) Date of Patent: Mar. 29, 2011

(54) SYSTEM AND METHOD FOR DISTRIBUTED CROSS-LEYER CONGESTION CONTROL FOR REAL-TIME VIDEO OVER WIRELESS LAN

(75) Inventors: Michael T. Loiacono, Hillsborough, NJ (US); Justinian Rosca, West Windsor, NJ (US); Chih-Wei Huang, Seattle, WA (US); Jenq-Neng Hwang, Bellevue, WA (US)

(73) Assignee: Siemens Corporation, Iselin, NJ (US)

( * ) Notice: Subject to any disclaimer, the term of this patent is extended or adjusted under 35 U.S.C. 154(b) by 345 days.

(21) Appl. No.: 12/252,580

(22) Filed: Oct. 16, 2008

(65) Prior Publication Data

US 2009/0154353 A1 Jun. 18, 2009

Related U.S. Application Data

(60) Provisional application No. 60/980,192, filed on Oct. 16, 2007, provisional application No. 61/075,384, filed on Jun. 25, 2008.

(51) Int. Cl.
*H04L 12/26* (2006.01)

(52) U.S. Cl. ...................................... 370/252
(58) Field of Classification Search .................. 370/252, 370/465, 469
See application file for complete search history.

(56) References Cited

U.S. PATENT DOCUMENTS

| 7,768,934 B2 * | 8/2010 | Yamanaka et al. | 370/252 |
| 7,779,443 B2 * | 8/2010 | Kim | 725/81 |
| 2010/0232292 A1 * | 9/2010 | Joung et al. | 370/230 |

\* cited by examiner

*Primary Examiner* — Melvin Marcelo
(74) *Attorney, Agent, or Firm* — Donald B. Paschburg; F. Chau & Associates, LLC

(57) ABSTRACT

A method for controlling congestion for real-time video transmission in a wireless network includes receiving a packet loss rate of a video camera in a wireless network, receiving an estimated maximum throughput of the video camera from the camera to a server, decrementing a bit transmission rate when the packet loss rate is greater than a first predetermined threshold, incrementing the bit transmission rate when the packet loss rate is less than a second predetermined threshold for a predetermined time period, and transmitting the bit transmission rate to a video encoder that is part of an application layer of a network communication protocol for the wireless network.

24 Claims, 14 Drawing Sheets

| Description \ Camera # | 1 | 2 | 3 | 4 | 5 | 6 |
|---|---|---|---|---|---|---|
| PHY Rate (Mpbs) | 11 | 11 | 5.5 | 5.5 | 2 | 2 |
| PHY Rate Ratio | 5.5 | 5.5 | 2.75 | 2.75 | 1 | 1 |
| $CW_{min}$ | 32 | 32 | 64 | 64 | 176 | 176 |
| Airtime Utility | 0.17316 | 0.177852 | 0.162435 | 0.171038 | 0.152995 | 0.162519 |
| Throughput (kbps) | 1234.213 | 1267.657 | 578.8859 | 609.5421 | 198.2704 | 210.6125 |
| Throughput Ratio | 5.860113 | 6.018904 | 2.748582 | 2.89414 | 0.941399 | 1 |

Table I

| Parameter | Comments |
|---|---|
| $T_{SIFS}$ | Single Inter-Frame Spacing time |
| $T_{DIFS}$ | $T_{SIFS} + 2 \cdot \sigma$ |
| $T_{BO}$ | Backoff time |
| $T_{ACK}$ | Ack frame time |
| $T_{PHY}$ | Preamble + PLCP time |
| $h_{MAC}$ | MAC header size |
| $T_{DATA}$ | $T_{PHY} + (h_{MAC} + f)/r_i$ |

Table II

FIG. 5

| Scenario \ Camera # | 1 | 2 | 3 | 4 | 5 | 6 | (7) |
|---|---|---|---|---|---|---|---|
| All High, N=6,(7) | 11 | 11 | 11 | 11 | 11 | 11 | (11) |
| One Low, N=6,(7) | 11 | 11 | 11 | 11 | 11 | 2 | (11) |
| Three Rates N=6, (7) | 11 | 11 | 5.5 | 5.5 | 2 | 2 | (11) |

Table III

FIG. 7

| Name | Description |
|---|---|
| Raw CBR | Constant bitrate that never changes (off-the-shelf) |
| Blind SRA | Source Rate Adaptation (SRA) without input from FATE (i.e. no limit on how high station can make its bitrate) |
| Smart SRA | Source Rate Adaptation (SRA) plus FATE |
| CLC | SRA plus FATE plus Contention Window Adaptation (CWA) |

Table IV

FIG. 8

| Layer | Parameter | Value |
|---|---|---|
| Application | Codec | MPEG4, Constant Bitrate, target rate configurable between 100kbps-800kbps, 100kbps per step GOV=30, Resolution=640x480, compression ∈ [0,10] |
| | Traffic Direction | One-way (Uplink video) |
| | Total Packet Size (bytes) | 1500 |
| Transport | Protocol | IP/UDP/RTP |
| | Header (bytes) | 20+8+12 |
| Link/MAC | Protocol | 802.11e |
| | Retry Limit | 3 |
| | Queue | Type: pfifo_fast Length=1000 packets |
| | Fragmentation | Disabled |
| | RTS/CTS | Disabled |
| Physical | Protocol | 802.11b |
| | Header (bytes) | 8 byte preamble |
| | Max Rate (bps) | 11 Mbps |
| | Base Rate (bps) | 1 Mbps |

Table V

FIG. 9

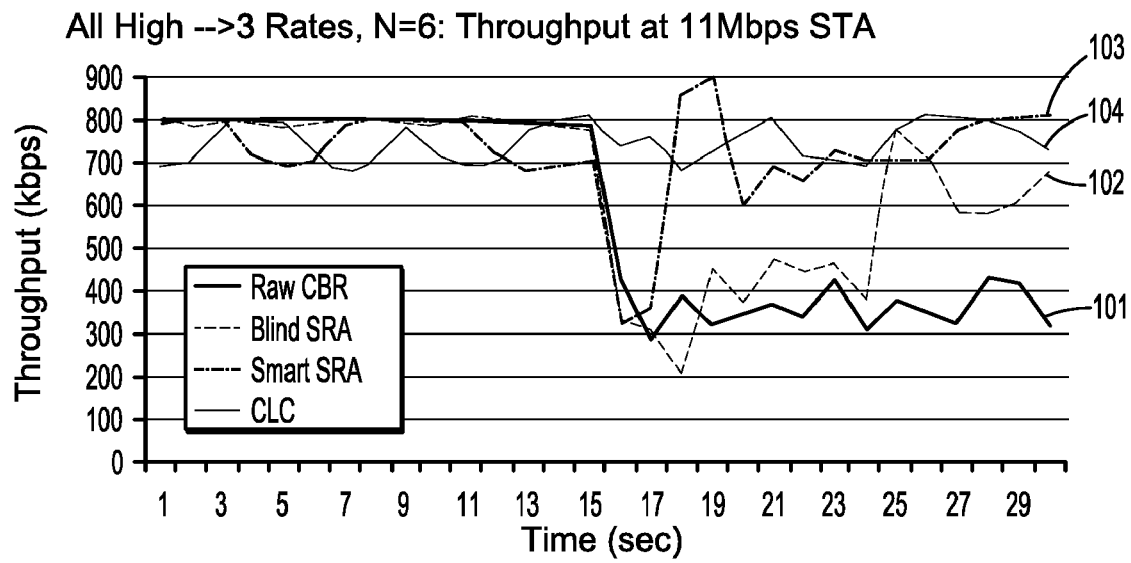
FIG. 10(a) 11 Mbps STA Throughput
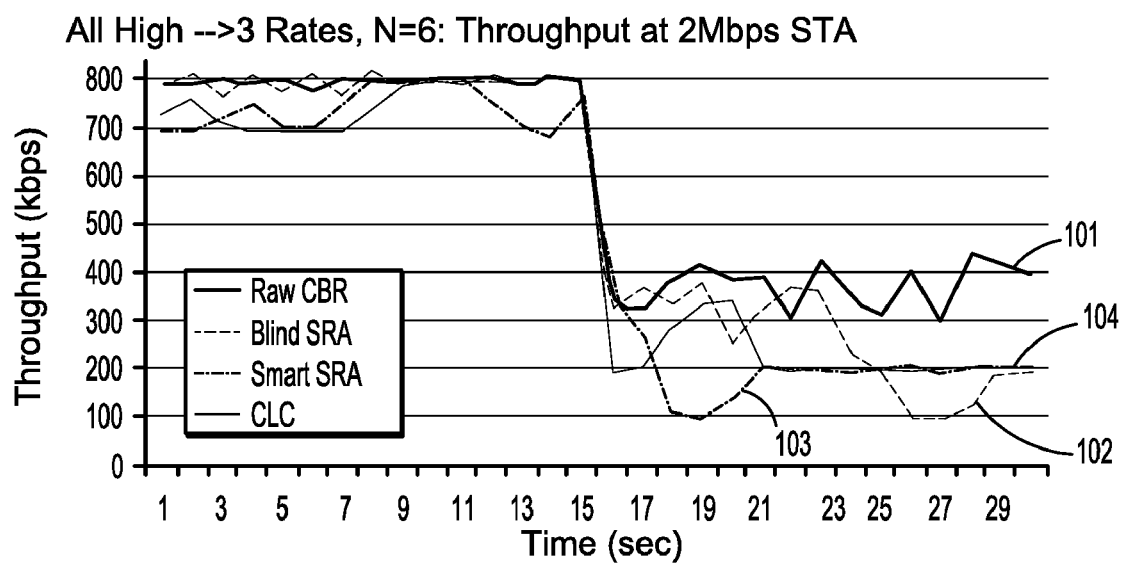
FIG. 10(b) 2 Mbps STA Throughput

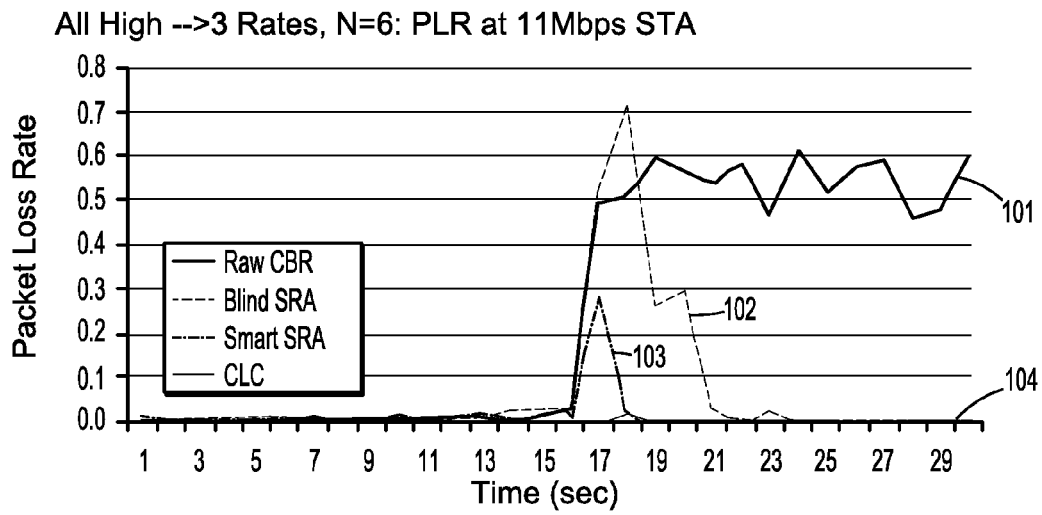
FIG. 10(c) 11 Mbps STA PLR
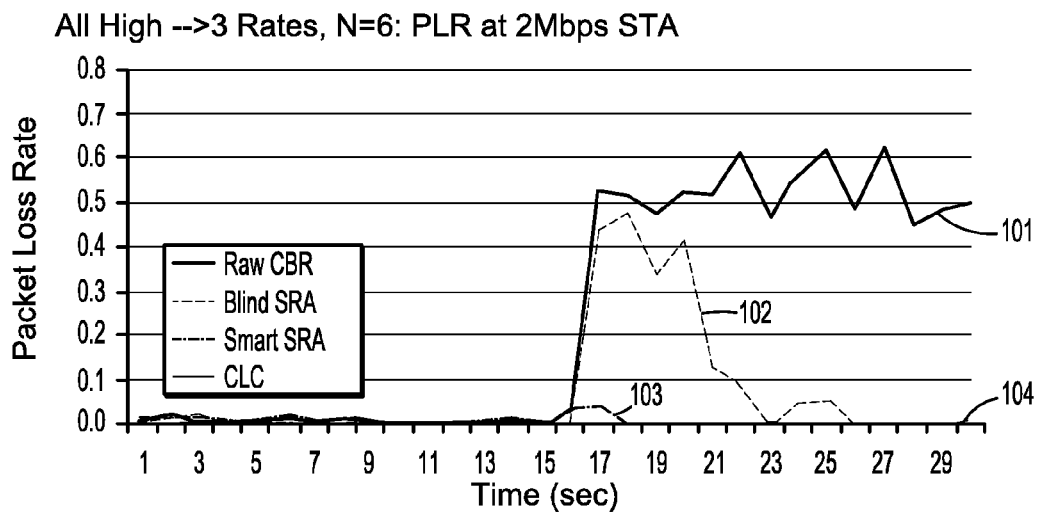
FIG. 10(d) 2 Mbps STA PLR
| Scenario \ Camera # | 1 | 2 | 3 | 4 | 5 | 6 | Total |
|---|---|---|---|---|---|---|---|
| One Low, Blind SRA | 496 | 559 | 324 | 571 | 561 | 592 | 3105 |
| One Low, CLC | 726 | 730 | 740 | 737 | 747 | 189 | 3871 |
| Three Rates, Blind SRA | 441 | 514 | 275 | 377 | 416 | 205 | 2231 |
| Three Rates, CLC | 745 | 747 | 498 | 488 | 178 | 186 | 2844 |
Table VI
FIG. 11

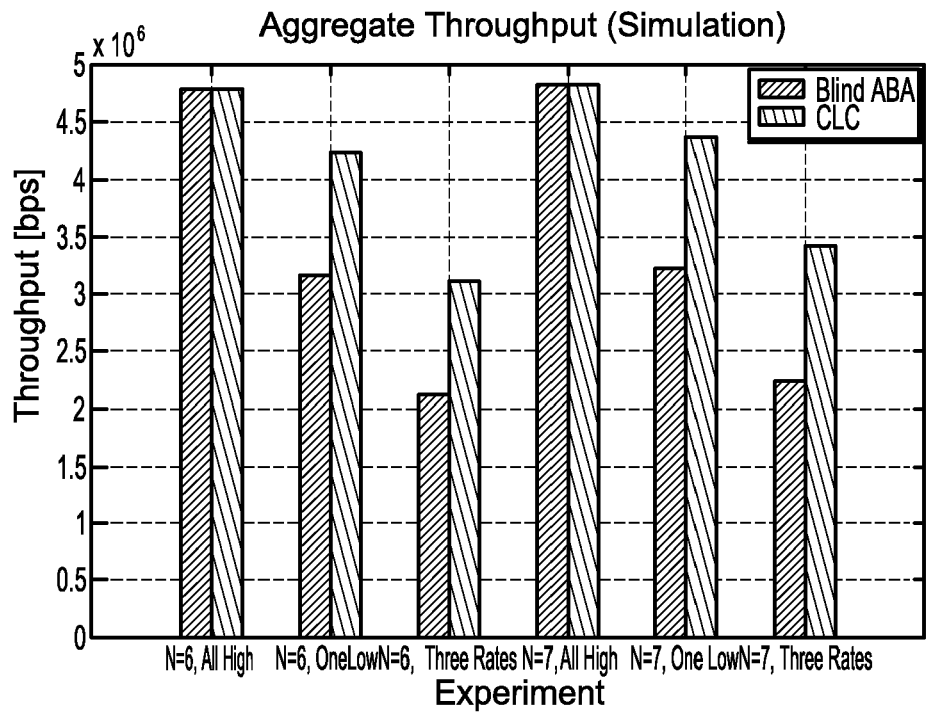
FIG. 12(a) Simulation
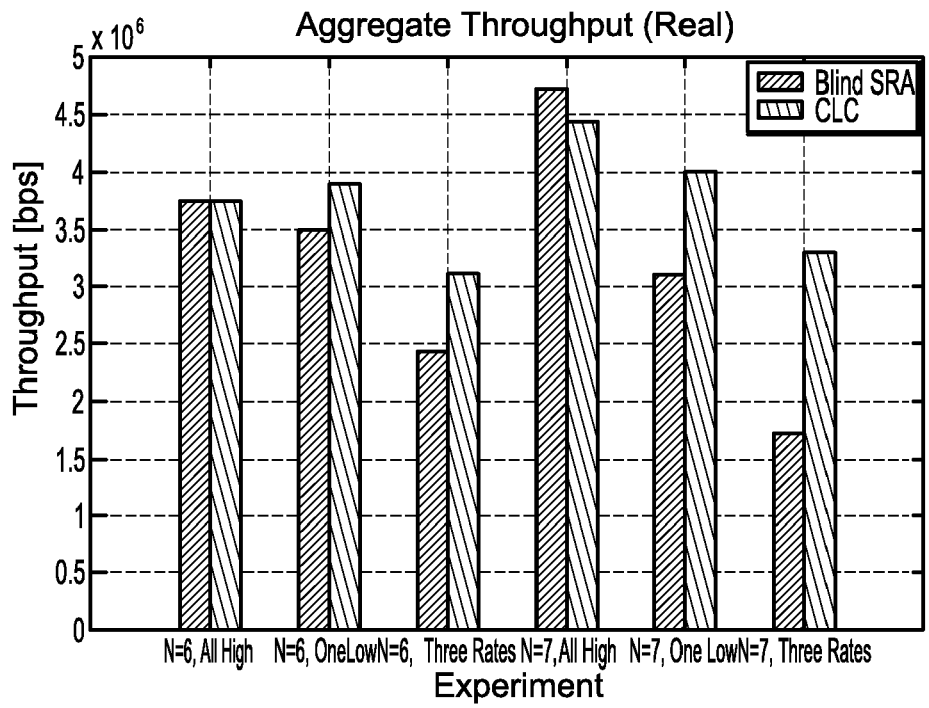
FIG. 12(b) Real

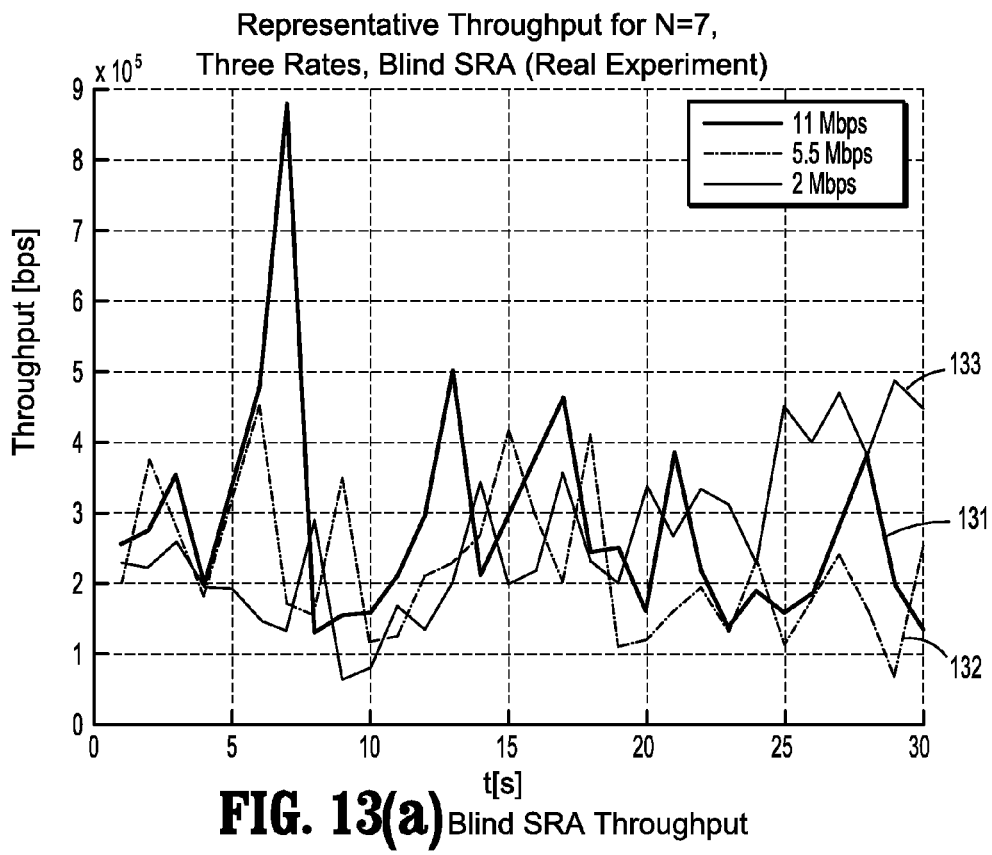
FIG. 13(a) Blind SRA Throughput
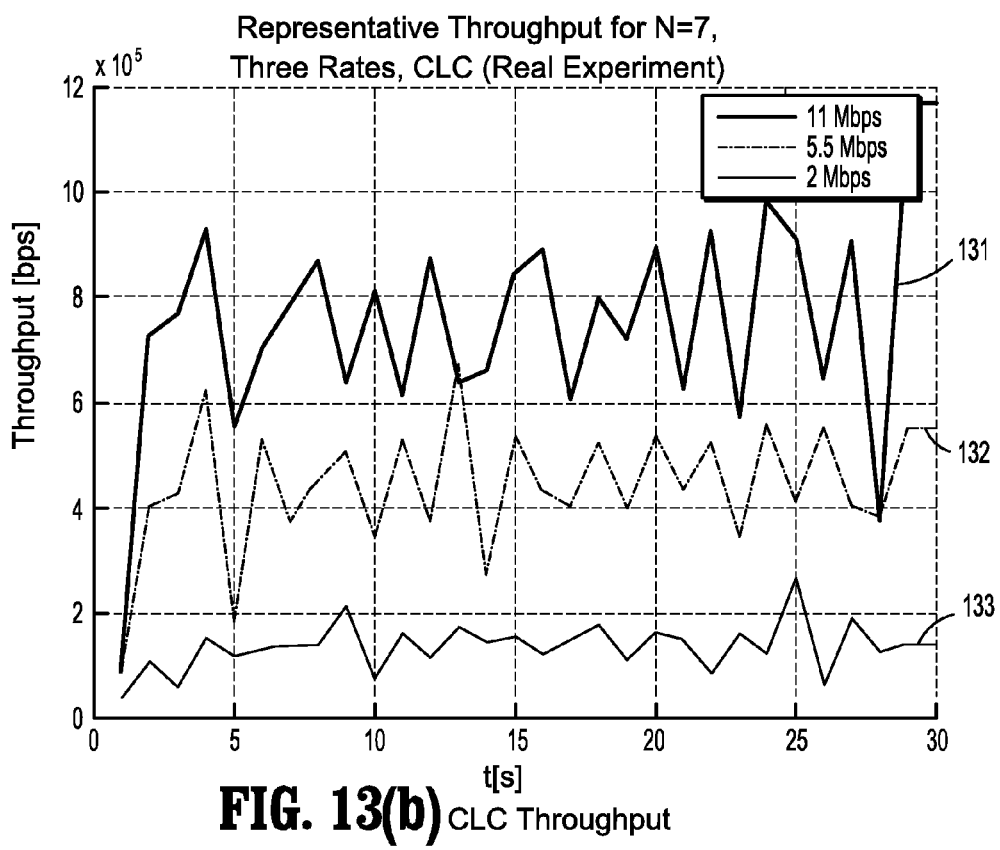
FIG. 13(b) CLC Throughput

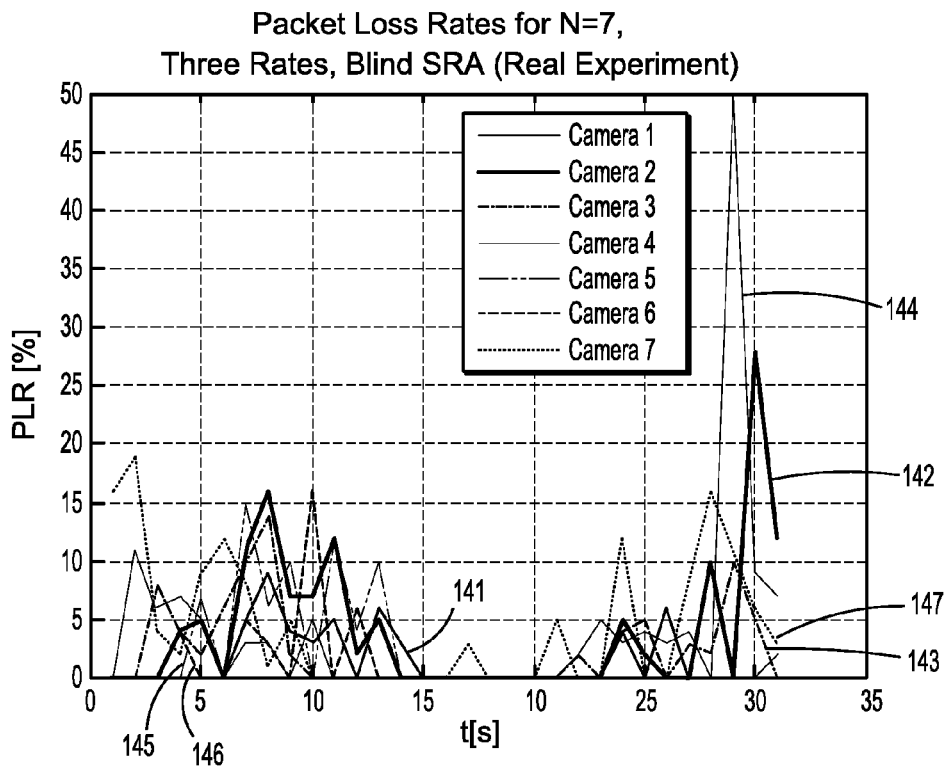
FIG. 14(a) Blind SRA Packet Loss
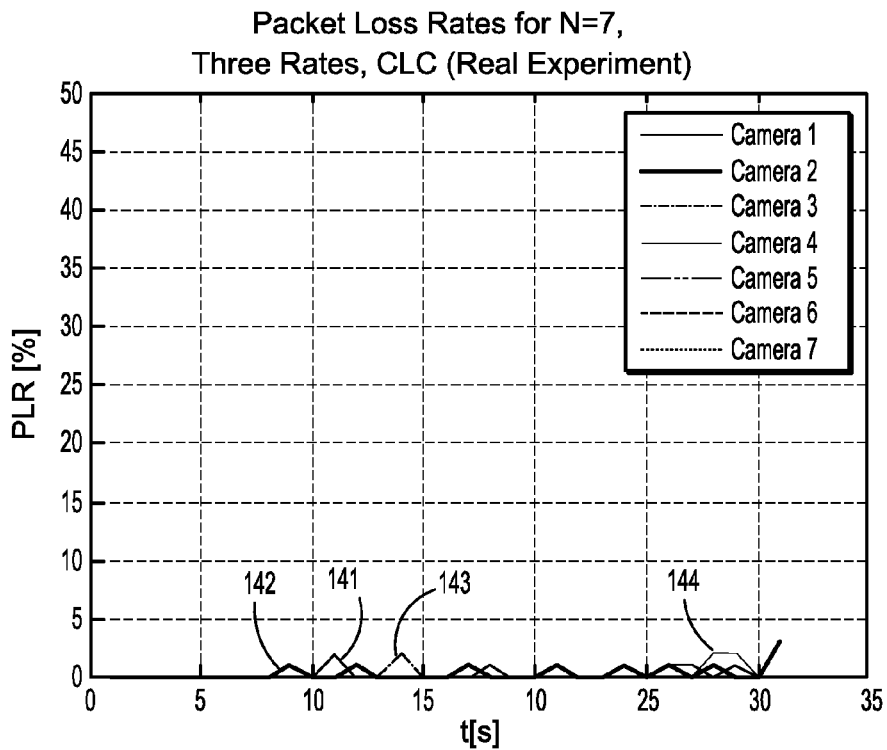
FIG. 14(b) CLC Packet Loss

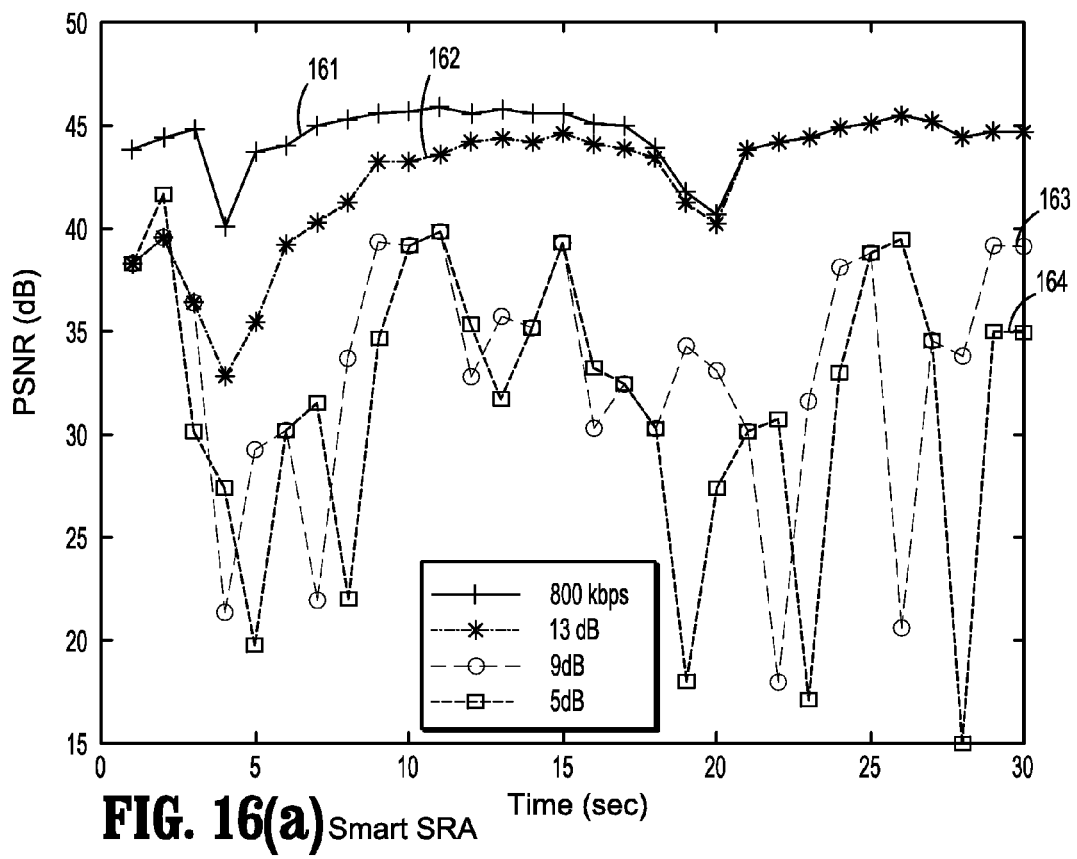
FIG. 16(a) Smart SRA
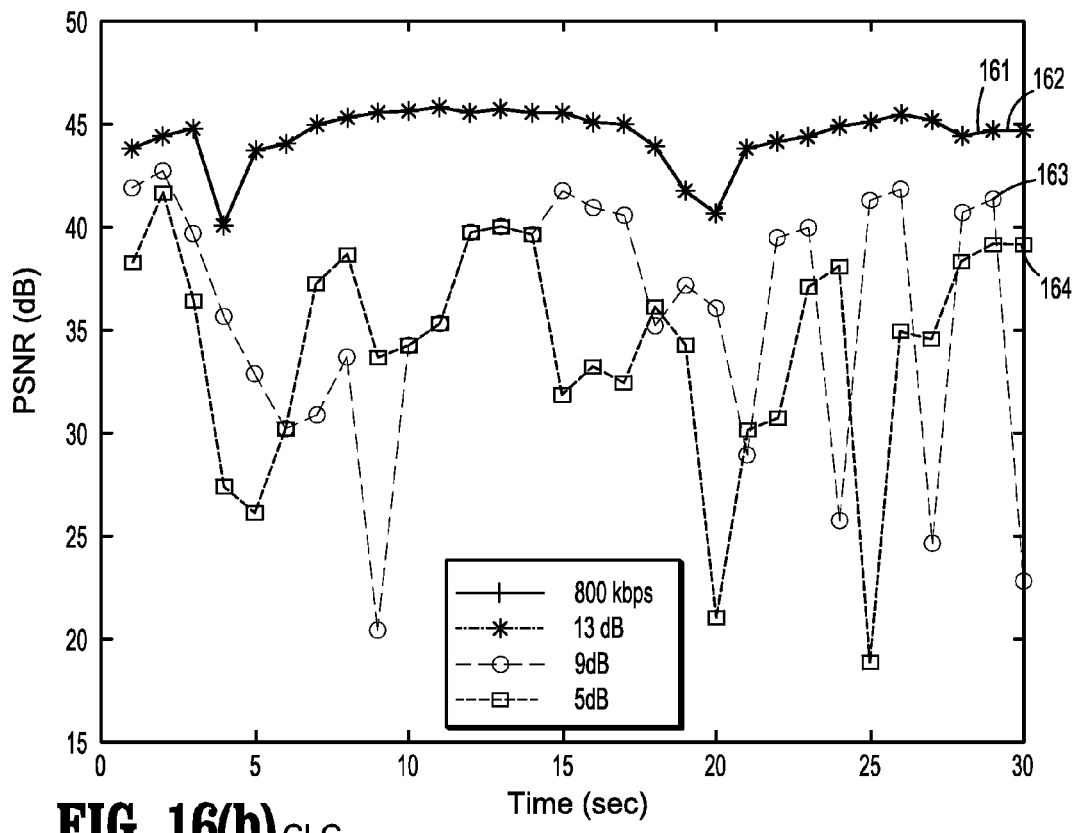
FIG. 16(b) CLC

SYSTEM AND METHOD FOR DISTRIBUTED CROSS-LEYER CONGESTION CONTROL FOR REAL-TIME VIDEO OVER WIRELESS LAN

CROSS REFERENCE TO RELATED UNITED STATES APPLICATIONS

This application claims priority from Provisional Application No. 60/980,192 of Loiacono, et al., filed Oct. 16, 2007, and from Provisional Application No. 61/075,384 of Loiacono et al., filed Jun. 25, 2008, the contents of which are herein incorporated by reference in their entireties.

TECHNICAL FIELD

This disclosure is directed to cross-layer adaptation systems for video transmission over wireless local area networks (WLANs).

DISCUSSION OF THE RELATED ART

The proliferation of wireless technology has encouraged a variety of multimedia services to become available on portable devices. For example, IPTV (Internet Protocol TV) streaming (downlink), real-time gaming, video surveillance (uplink), and conferencing (bi-directional) over the wireless medium have all become alternatives to conventional multimedia content delivery. Unfortunately, the wireless-enabling technology, IEEE 802.11 WLAN, can be easily demonstrated to fail when subjected to the congested conditions associated with many of these real applications. These effects are a serious hurdle for the deployment and advancement of wireless technologies, and therefore, a congestion-control remedy is needed.

Multimedia has several properties that affect the way systems are designed to control congestion and optimize delivery. First, frequent quality changes within a short period can be very annoying to the users, but sparse quality issues can often be concealed by today's video codecs. Therefore, error-free communication over the link is not critical if robust codecs are used. Second, in real deployments, link conditions vary rapidly over time and space, so physical (PHY) rates and modulation schemes vary from camera to camera. Furthermore, in multi-camera wireless environments, the risk for congestion increases with each additional client. At the same time, users of multimedia systems expect instant content delivery with good quality.

Translating the above properties into network parameters means that users prefer a system with low latency, low packet loss, high throughput, and robustness to failure. However, there are many issues to be addressed in a layered IP architecture. In the descriptions that follow, it will be assumed that the wireless LAN communication protocol is consistent with the layered approach of the Open Systems Interconnection (OSI) model.

(1) Performance Anomaly: Conventional use of the 802.11 distributed coordination function (DCF) results in a system that achieves throughput fairness, but at the cost of decreased aggregate system throughput and increased congestion.

(2) Imperfect Link Adaptation (LA): At the media access control (MAC) level of the OSI, devices implement LA intelligence to select modulation and channel coding schemes according to the estimated channel conditions. However, today's LA algorithms can be misled by collision errors, thus lowering the PHY rate even though the signal-to-noise ratio (SNR) is good, which in turn leads to an even higher collision probability. This "Snowball Effect" quickly leads the system into catastrophic failure.

(3) Available Bandwidth Estimation: It is often desirable for congestion control algorithms to estimate the available bandwidth. At the application (APP) layer of the OSI model, systems suffer from slow and inaccurate capabilities to estimate end-to-end available bandwidth. A measure of the available bandwidth can not be very accurate in the absence of MAC layer information.

Given these issues regarding a single-layer solution, several cross-layer adaptation systems for video transmission have been proposed. Adaptive quality-of-service (QoS) can be provided by utilizing real-time MAC parameter adaptation on the retry limit plus priority queuing. In addition, background traffic can be considered in the adaptation process. A cross-layer signaling scheme can be used to pass link quality information to the video coder based on signal strength and estimated throughput, but the performance anomaly is still an issue. The peak signal-to-noise ratio (PSNR) can also be used as the quality metric through pre-estimated distortion, but this is not suitable for real-time video applications. Another approach estimates link capacity then jointly allocates it with video flows to maximize link utilization.

SUMMARY OF THE INVENTION

Exemplary embodiments of the invention as described herein generally include methods and systems for a distributed cross-layer congestion control algorithm that provides enhanced QoS and reliable operation for real-time uplink video over WiFi applications. An algorithm according to an embodiment of the invention can adaptively ensure wireless video transmission of acceptable quality in an uplink, multi-camera topology as shown in FIG. 1, where videos are streaming from a plurality of wireless cameras 11 to a server 12 through an access point 13. Suitable applications include wireless home entertainment, video surveillance, and real-time monitoring for search/rescue. To provide adequate QoS, it is preferred to apply airtime fairness with a cross-layer approach by using a fast frame-by-frame control loop in the CSMA/CA based MAC layer while simultaneously exploiting the powerful control loop gain attainable by performing source-rate adaptation in the APP layer at a slower timescale. The use of airtime fairness combined with video source rate adaptation increases aggregate throughput, decreases the packet loss rate (PLR), and improves robustness.

A system according to an embodiment of the invention is implemented according to a distributed architecture, manifested as a module which runs within each camera that has two tasks: (1) induce airtime fairness, and (2) perform video source rate adaptation. Implementing these tasks involves:

(1) Scaling the video encoder's target bit rate according to the camera's observed packet loss rate. This process is referred to as "SRA" (Source Rate Adaptation).

(2) Imposing an upper-bound on the video encoder's target bit rate according to a formula referred to as "FATE" (Fair Airtime Throughput Estimation), which computes the maximum throughput that the camera is allowed to use in order to guarantee system-wide airtime fairness.

(3) Adapting the 802.11 MAC parameters, in particular the contention window, to control access to the channel in a way that guarantees system-wide airtime fairness at a quick timescale. This adaptation is referred to as "CWA" (Contention Window Adaptation).

Overall, an implementation of an embodiment of the invention represents a distributed cross-layer architecture. An analysis and validation of an algorithm according to an embodiment of the invention is based on both simulation and experimental implementation of the algorithm in programmable wireless cameras. Results from real experiments match those from simulation, and demonstrate improved performance in video over WLAN in terms of both throughput and packet loss. When applying more practical and severe conditions such as suboptimal link adaptation, or dynamically adding cameras, the control scheme can sustain a very good PSNR.

According to an aspect of the invention, there is provided a method for controlling congestion for real-time video transmission in a wireless network connecting a plurality of video cameras to a central server, including receiving a packet loss rate of a video camera in a wireless network, receiving an estimated maximum throughput of the video camera from the camera to a server, decrementing a bit transmission rate when the packet loss rate is greater than a first predetermined threshold, incrementing the bit transmission rate when the packet loss rate is less than a second predetermined threshold for a predetermined time period, and transmitting the bit transmission rate to a video encoder that is part of an application layer of a network communication protocol for the wireless network.

According to a further aspect of the invention, the packet loss rate is received from a media access control layer of the network communication protocol.

According to a further aspect of the invention, the estimated maximum throughput is received from a fair airtime throughput estimator.

According to a further aspect of the invention, the method includes calculating the estimated maximum throughput from $$G_e \approx \frac{1}{N} \cdot G_{MAX} \cdot (1 - p_f),$$

where $G_{max}$ is a theoretical maximum throughput of the video camera, N is a number of cameras in the network, and $p_f^i$ is an estimated portion of video frames successfully transmitted in a given amount of airtime share.

According to a further aspect of the invention, $p_f^i$ is calculated from a frame error rate received from the media access control layer.

According to a further aspect of the invention, the method includes receiving at a contention window adaptation module the bit transmission rate from the media access control layer, calculating a contention window size from $$CW_{min}^i = \min\left\{ \left\lfloor \frac{r_{max}}{r_i} \cdot CW_{min}^o \right\rfloor, CW_{max} \right\},$$

where $r_{max}$ is a maximum PHY bitrate for the camera, $r_i$ is an actual PHY bitrate for the camera received from the media access control layer, $CW_{min}^o$ is an initial contention window size for the camera, and $CW_{max}$ is a maximum contention window size, and sending the contention window size to the media access control layer.

According to a further aspect of the invention, the contention window size is calculated for each video data frame immediately before the frame enters a backoff process.

According to a further aspect of the invention, the method includes calculating an average estimated maximum throughput from a plurality of estimated maximum throughputs received from the fair airtime throughput estimator, and incrementing the bit transmission rate when a sum of the bit transmission rate and an increment amount is less than or equal to $$\min\left\{ \overline{G_e^i} \cdot \frac{1}{1-\eta_1}, V_{max} \right\},$$

where $\overline{G_e^i}$ is the average estimated maximum throughput, $\eta_1$ is the first predetermined threshold, and $V_{max}$ is a maximum transmission rate.

According to a further aspect of the invention, the method includes decrementing the bit transmission rate when bit transmission rate is greater than or equal to a minimum bit transmission rate plus a decrement amount.

According to a another aspect of the invention, there is provided a method for controlling congestion for real-time video transmission in a wireless network connecting a plurality of video cameras to a central server, including receiving a frame error rate of a video camera in a wireless network from a media access control layer of a network communication protocol for the wireless network, receiving a bit transmission rate from the media access control layer, receiving a number of cameras in the network, calculating an estimated maximum throughput of the video camera from the frame error rate, the bit transmission rate, and the number of cameras, sending the estimated maximum throughput to a source rate adaptation module for adjusting the bit transmission rate, calculating a contention window size from the bit transmission rate, and sending the contention window size to the media access control layer, where the contention window size maintains network airtime fairness.

According to a further aspect of the invention, adjusting the bit transmission rate comprises receiving a packet loss rate of the video camera from media access control layer, decrementing the bit transmission rate when the packet loss rate is greater than a first predetermined threshold, incrementing the bit transmission rate when the packet loss rate is less than a second predetermined threshold for a predetermined time period, and transmitting the bit transmission rate to a video encoder that is part of an application layer of the network communication protocol.

According to a further aspect of the invention, the estimated maximum throughput of the video camera is calculated from $$G_e \approx \frac{1}{N} \cdot G_{MAX} \cdot (1 - p_f),$$

where $G_{max}$ is a theoretical maximum throughput of the video camera, N is a number of cameras in the network, and $p_f^i$ is an estimated portion of video frames successfully transmitted in a given amount of airtime share determined from the frame error rate received from the media access control layer.

According to a further aspect of the invention, the contention window size is calculated from $$CW_{min}^i = \min\left\{ \left\lfloor \frac{r_{max}}{r_i} \cdot CW_{min}^o \right\rfloor, CW_{max} \right\},$$

where $r_{max}$ is a maximum PHY bitrate for the camera, $r_i$ is an actual PHY bitrate for the camera received from the media access control layer, $CW_{min}^o$ is an initial contention window size for the camera, and $CW_{max}$ is a maximum contention window size.

According to a further aspect of the invention, the method includes calculating an average estimated maximum throughput from a plurality of estimated maximum throughputs received from the fair airtime throughput estimator, and incrementing the bit transmission rate when a sum of the bit transmission rate and an increment amount is less than or equal to $$\min\left\{\overline{G_e^i} \cdot \frac{1}{1-\eta_1}, V_{max}\right\},$$

where $\overline{G_e^i}$ is the average estimated maximum throughput, $\eta_1$ is the first predetermined threshold, and $V_{max}$ is a maximum transmission rate.

According to a further aspect of the invention, the method includes decrementing the bit transmission rate when bit transmission rate is greater than or equal to a minimum bit transmission rate plus a decrement amount.

According to a another aspect of the invention, there is provided a program storage device readable by a computer, tangibly embodying a program of instructions executable by the computer to perform the method steps for controlling congestion for real-time video transmission in a wireless network connecting a plurality of video cameras to a central server.

BRIEF DESCRIPTION OF THE DRAWINGS

FIG. 5 is a table of MAC delay components, according to an embodiment of the invention.

FIG. 7 is a table of various multirate scenarios in (MBPS), according to an embodiment of the invention.

FIG. 8 is a table of various solutions under test, according to an embodiment of the invention.

FIG. 9 is a table of the network configurations under test, according to an embodiment of the invention.

FIGS. 10(a)-(d) are graphs of simulation results for PLR and throughput, according to an embodiment of the invention.

FIG. 11 is a table of simulation average throughput results in (KBPS), according to an embodiment of the invention.

FIGS. 12(a)-(b) are graphs of aggregate system throughput for Blind SRA vs. CLC, according to an embodiment of the invention.

FIGS. 13(a)-(b) are graphs of representative throughput for Blind SRA vs. CLC, according to an embodiment of the invention.

FIGS. 14(a)-(b) are graphs of Packet Loss Rate for Blind SRA vs. CLC, according to an embodiment of the invention.

FIGS. 16(a)-(b) are graphs of PSNR results for two schemes, Smart SRA and CLC, according to an embodiment of the invention.

DETAILED DESCRIPTION OF EXEMPLARY EMBODIMENTS

Figure 1:
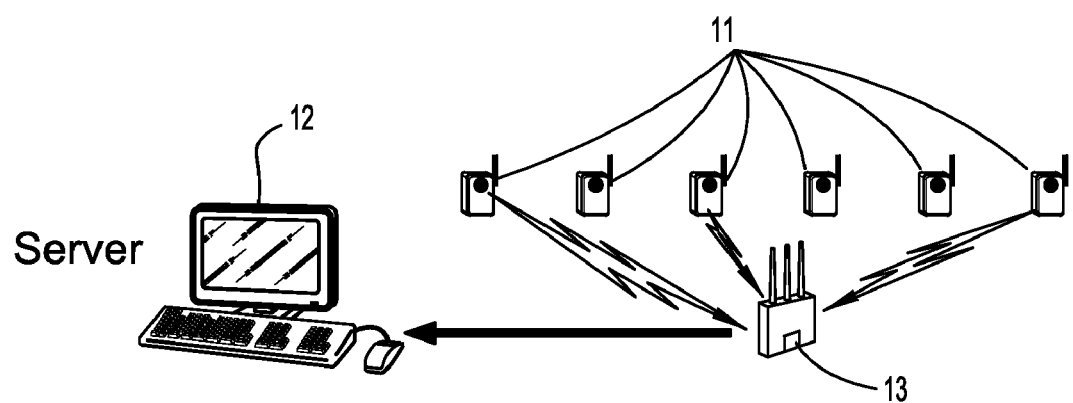
FIG. 1 depicts an exemplary wireless video transmission topology, according to an embodiment of the invention.

Exemplary embodiments of the invention as described herein generally include systems and methods for cross-layer congestion control for video transmission over wireless local area networks (WLANs). Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Airtime Fairness

Figure 2:
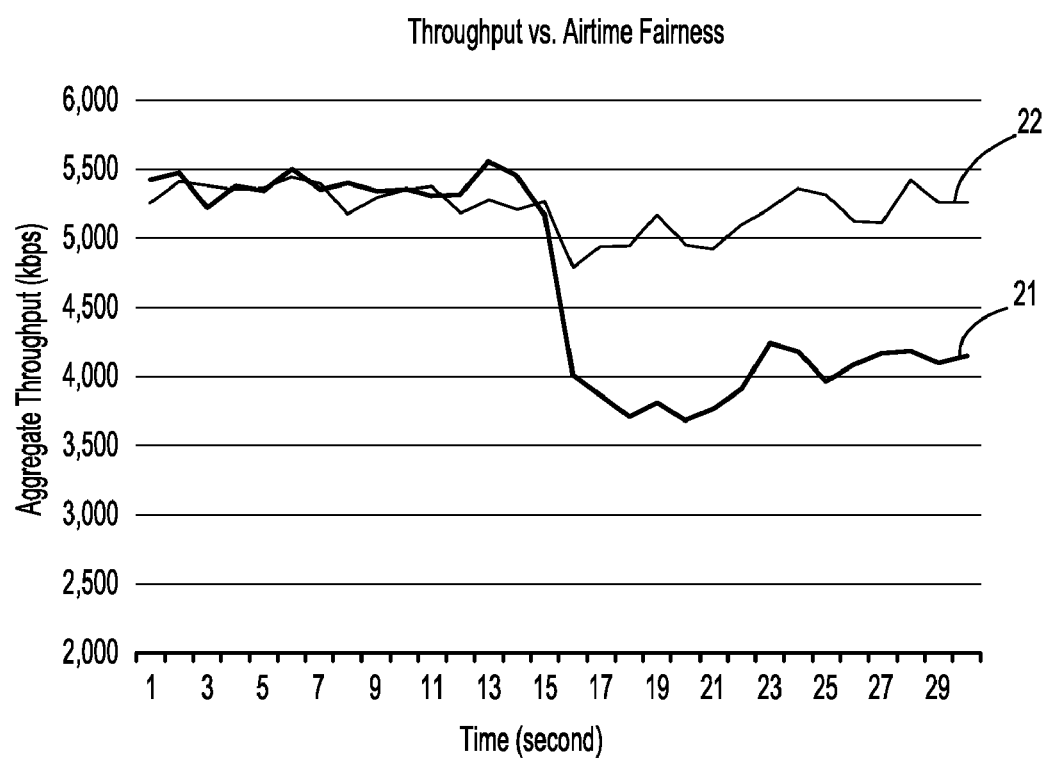
FIG. 2 is a graph of throughput vs. airtime fairness, according to an embodiment of the invention.

It is well known that per-station throughput in a WLAN multi-rate basic service set (BSS) tends to move quickly toward the rate of the lowest rate station in the BSS. Channel access among competing stations is managed such that stations divide the available throughput according to CSMA/CA (Carrier Sense Multiple Access/Collision Avoidance), which implements a throughput fairness policy. FIG. 2 illustrates throughput vs. airtime fairness, showing the effect of one out of ten stations in a BSS dropping its PHY rate from 11 Mbps to 2 Mbps. The line 21 shows the aggregate system throughput under a throughput fairness regime, and the line 22 is aggregate system throughput under an airtime fairness regime. Initially, all 10 stations are at 11 Mbps. At t=15, one of 10 stations switches from 11 Mbps to 2 Mbps. The aggregate system throughput is reduced in the case of throughput fairness. Throughput fairness results in decreased aggregate system throughput (from about 5.5 to 4 Mbps in FIG. 2), no throughput guarantees above a minimum level, and a possibility of congestion with the added danger of completely dropping some video flows. Consequently, if a station switches its PHY rate, then one wants to adapt that station's channel share and video source rate accordingly in order to protect the system from catastrophic behavior. A balanced allocation of airtime is desired such that a slow station does not consume more airtime than a fast station. This principle is referred to as airtime fairness.

The fairness issue in IEEE 802.11 WLAN has received considerable attention in the recent literature. Proportional fairness has been recommended as the optimized objective of resource allocation in multi-rate wireless networks. If multiple stations contend for a shared resource, the system shall guarantee individual throughput proportional to its capacity. Airtime fairness is a natural result of the more fundamental proportional fairness. Accordingly, multi-rate stations can contend in a fair manner by incorporating control techniques with proper objectives.

According to an embodiment of the invention, two ways of controlling access to the medium, and therefore allocating airtime, are as follows:

(1) MAC Layer Approach: Adapt the contention window. If two stations are contending for the channel, the one with a smaller initial contention window size ($CW_{min}$) is the one that is more likely to win the contention.

(2) APP Layer Approach: Adapt the video bit rate. A station that transmits video encoded at a 400 kbps bit rate will not contend as aggressively for the channel as a station that transmits video encoded at a 800 kbps bit rate.

Although one can control airtime from either the APP or the MAC, a solution according to an embodiment of the invention uses both methods simultaneously. The two individual methods each have drawbacks; however, controlling airtime simultaneously from the MAC and the APP enables a joint solution.

MAC-Layer Airtime Control

It has been shown that the initial contention window size $CW_{min}$ is an effective parameter for controlling airtime share over time. The intuition for contention window adaptation (CWA) is as follows.

Assume a set of stations $S=\{1, \ldots, N\}$. In a time interval, an arbitrary station, i, under static channel conditions consumes data airtime $A_i$ in $n_i$ transmissions given by:

$$A_i = \frac{1}{r_i}\sum_{k=1}^{n_i} f_k = n_i \frac{\bar{f}}{r_i}, \quad (1)$$

where $f_k$ is the MAC service data unit size (MSDU) size for the $k^{th}$ frame transmission, $\bar{f}$ is the average size, and $r_i$ is the PHY rate applied.

From the CSMA/CA process, $CW_i$ defines the allowable range of contention windows size, in which the backoff time is randomly determined by a number uniformly drawn within the interval of $[0, CW_i-1]$. Therefore, the expected value of backoff time, B, is $$E\left[\sum_{k=1}^{n_i} B_k\right] = n_i E[B] \approx n_i \frac{CW_{min}^i}{2} \cdot SlotTime, \quad (2)$$

where SlotTime is smallest discrete time step for the 802.11 channel access algorithm, assuming collisions and wireless errors are both low due to proper CWA and link adaptation. Since all stations perform backoff simultaneously, one can approximate that, for stations i and j, $$\sum_{k=1}^{n_i} B \approx \sum_{k=1}^{n_j} B_k^j$$

if and only if $$\frac{n_i \cdot CW_{min}^i}{n_j \cdot CW_{min}^j} = 1. \quad (3)$$

Airtime fairness is achieved if $A_i=A_j$ (c.f. EQ. (1)). If this equality is to hold, then, since $\bar{f}$ is constant, there is airtime fairness if $n_i/n_j=r_i/r_j$. Plugging this back into EQ. (3), these is airtime fairness criteria in a multirate environment if $$r_i \cdot CW_{min}^i = r_j \cdot CW_{min}^j. \quad (4)$$

Thus, by tuning the $CW_{min}$ ratio, relative fair airtime share can be realized.

The CWA control scheme has been verified using the 802.11 Network Simulator Version 2 (NS2) configured with saturated traffic and six stations operating at three different PHY rates. Table I, shown in FIG. 3, displays the airtime fairness results among stations with $CW_{min}$ set according to EQ. (4) with saturated traffic. There are ratios of two measurements, PHY rate and throughput, in the table, which indicate the proportion of each measurement on corresponding station to station at the lowest 2 Mbps PHY rate (station 6) from the test. Airtime utility is evaluated as the share of data transmission time for each station. Taking the average airtime utility of two high rate stations and comparing to the ideal share at 0.1667, one obtains 5.3% of error margin. Thus, the high PHY rate stations gain 5 to 6% more airtime share than the ideal share at 0.1667. Consequently, by tuning the CWmin ratio, relative fair airtime share can be realized.

Note that a MAC-Layer Adaptation has a fast frame-by-frame timescale reaction. Changing $CW_{min}$ instantaneously modifies the station's channel access properties. However, such a change may also lead to high packet loss at the interface queue unless additional action is taken. This effect can be illustrated with an example. Consider two stations, Camera A and Camera B, both transmitting MPEG4/RTP video encoded at a bit rate of 800 Kbps. Camera A uses an 11 Mbps PHY rate and Camera B uses a 2 Mbps PHY rate. Under airtime fairness, the CWA policy penalizes (lowers) Camera B's channel access probability by a factor proportional to its reduced PHY rate. This reduction in access probability combined with the lower PHY rate puts a theoretical limit on the maximum throughput that Camera B can attain. If this limit is less than 800 Kbps (approximately the minimum throughput needed to sustain a video encoded at 800 Kbps), then the transmitter's queue will saturate and begin dropping packets. Consequently, the received video quality will drop due to increased packet loss.

APP-Layer Airtime Control

The upper bound on throughput imposed by CWA guarantees system-wide airtime fairness. Is there another way to impose such an upper-bound without using CWA? Suppose there is an algorithm that can "match" the encoder's target bit rate with the throughput constraint that's implicitly imposed by a CWA algorithm according to an embodiment of the invention. For example, in the previous case, suppose the upper bound was 500 Kbps. If the CWA policy is deactivated and Camera B's video encoder is told to lower its target bit rate from 800 Kbps to 500 Kbps, then airtime fairness will have been implicitly induced without using CWA.

Since CWA is not actually being used in a APP-Layer approach according to an embodiment of the invention, a formula is needed that can predict the upper bound on throughput that CWA would have imposed given a set of current network conditions. In a solution according to an embodiment of the invention, a module that implements this formula is referred to as the Cross Layer Fair Airtime Throughput Estimation (FATE).

To implement airtime fairness according to an embodiment of the invention, a technique is applied whereby SRA cooperates with FATE. The intuition of SRA is that reducing the target bit rate of the video reduces packet loss. On the other hand, when packet loss is low, SRA can increase the target bit rate. A process of adapting target bitrate within the upper bound set by FATE is referred to as "Smart SRA". When FATE is ignored, it is possible to set the target bit rate higher than the theoretical maximum allowed for airtime fairness, a process referred to as "Blind SRA". A Blind SRA process is only used for comparison purposes.

Controlling airtime using source bit rate adaptation allows solving the high packet loss that plagues a CWA solution according to an embodiment of the invention. In the previous example, CWA put an upper bound on Camera B's throughput (say, 500 Kbps), but the camera still tried transmitting video encoded at a 800 Kbps target bit rate, resulting in high packet loss. However, when an APP-Layer approach is used, the encoder's target bit rate is we physically changed from 800 Kbps to 500 Kbps, thus reducing packet loss compared to CWA. However, it operates on a slow timescale since video encoders take several seconds to fully reach a newly set target bit rate. Furthermore, FATE's reacts on fixed 100 ms intervals rather than on fast frame-by-frame time scale like CWA.

Thus, simultaneously performing APP and MAC layer airtime control yields a combination of low packet loss (due to APP) and quick reactivity/stability (due to MAC).

Implementing Distributed Cross-Layer Congestion Control

Figures 3, 4:
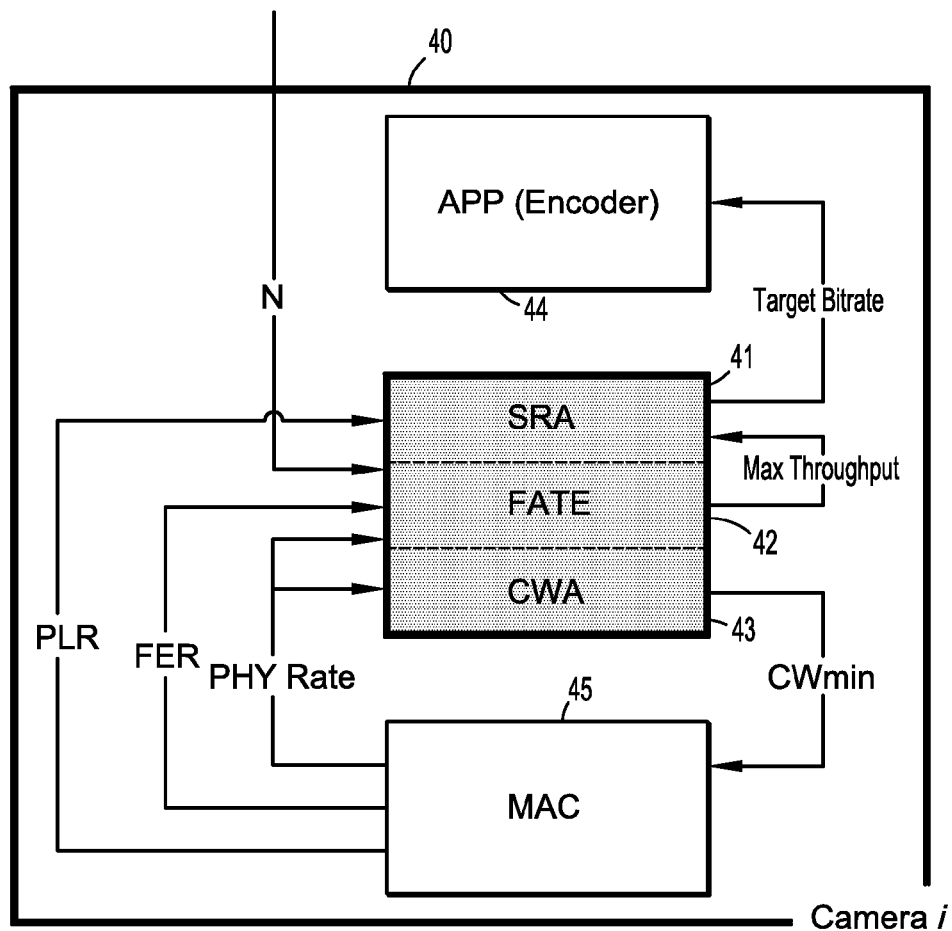
FIG. 3 is a table of results for Airtime Fairness under Approximated Control Equation and Saturated Traffic, according to an embodiment of the invention.
FIG. 4 is an exemplary CLC system diagram, according to an embodiment of the invention.

A cross-layer congestion control (CLC) system according to an embodiment of the invention is shown in FIG. 4 for a single camera 40. Since the system is distributed, each camera has its own instantiation. All instantiations share the number N of active cameras in the BSS. As will be seen, N can be changed dynamically. A cross-layer congestion control (CLC) system according to an embodiment of the invention includes a SRA module 41 that received a packet loss rate (PLR) from the MAC layer 45 and a maximum throughput from a FATE module 42. The SRA 41 calculates a target bitrate and transmits it to the video encoder, part of the APP layer 44. The FATE module 42 takes the frame error rate (FER) as well as the PHY rate information from the MAC 45, and N from the application server to compute the maximum throughput that a station can attain to maintain system-wide airtime fairness, and transmits it to the SRA module 41. In an exemplary embodiment of the invention, the FATE module samples the FER every 100 ms. During every adjustment to the target bitrate, CWA module 43 receives the PHY bitrate from the MAC layer 45, calculates the minimum contention window size $CW_{min}$, and transmits it back to the MAC layer 45. CWA 43 can instantly provide airtime fairness while the relatively slow video encoder in the APP layer 44 "catches up" to the new target bitrate.

Figure 6:
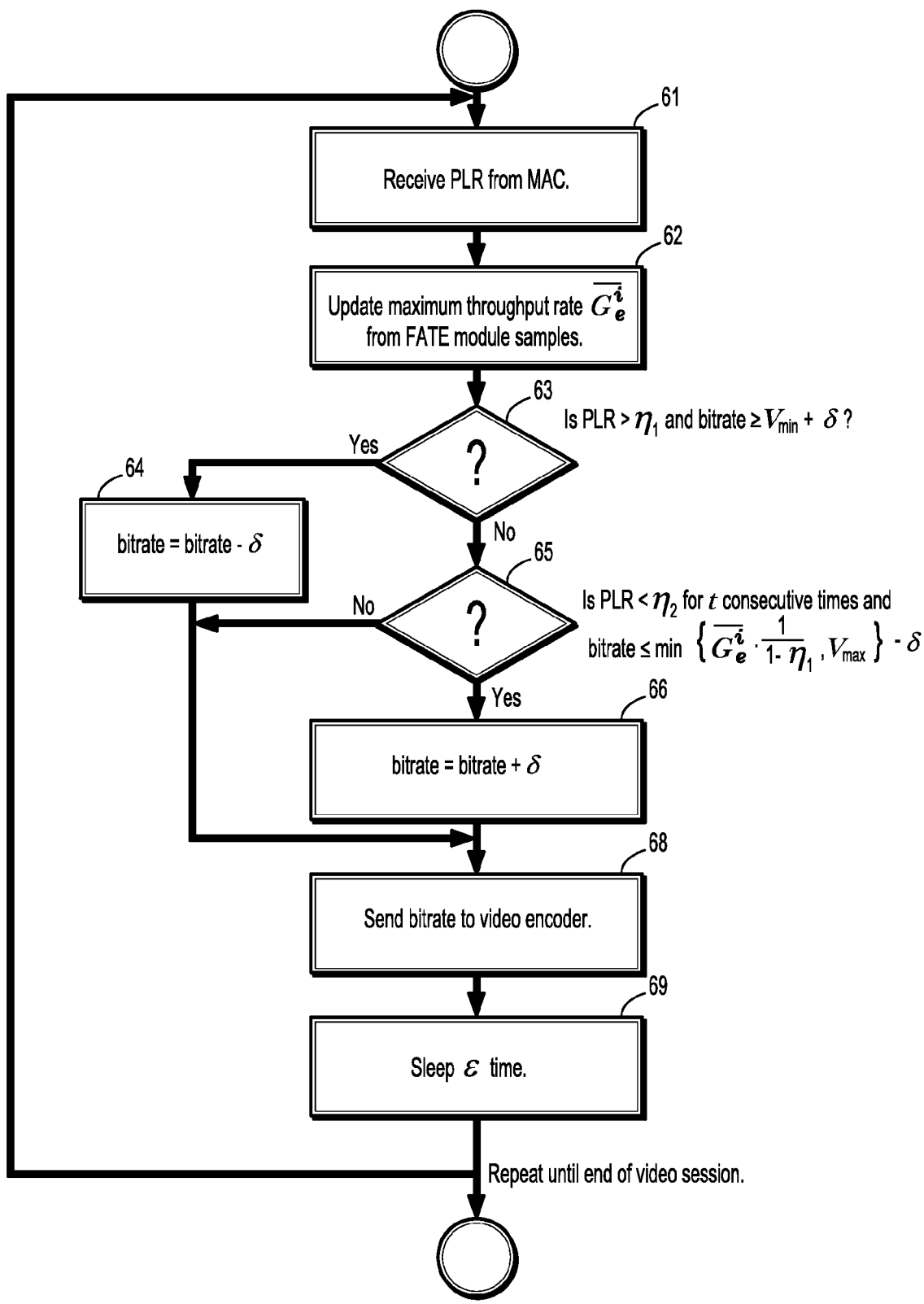
FIG. 6 is a flow chart of a cross-layer congestion control algorithm according to an embodiment of the invention.

A flowchart of an SRA module according to an embodiment of the invention operates on each camera is presented in FIG. 6. The following steps are repeated until the end of a video session. At step 61, SRA module 41 receives from the MAC 45 a packet loss rate (PLR). At step 62, the maximum throughput rate is received from the FATE module 43 and averaged to calculate $\overline{G_e^i}$. If, at step 63, the PLR is higher than a first predetermined threshold $\eta_1$, and if the bitrate greater than a minimum value $V_{min}$ plus a decrement amount $\delta$, then at step 64 the SRA module 41 incrementally reduces the target bitrate by the decrement amount $\delta$. If, at step 65, the PLR stabilizes at a low value less than a second predetermined threshold for a certain amount of time, and if the bitrate is less than or equal to $$\min\left\{\overline{G_e^i} \cdot \frac{1}{1-\eta_1}, V_{max}\right\} - \delta,$$

where $\overline{G_e^i}$ is the average estimated maximum throughput for camera i, $\eta_1$ is the first predetermined threshold, and $V_{max}$ is a maximum transmission rate, then, at step 66, the SRA increases the target bitrate stepwise by $\delta$ as long as the new target bitrate does not exceed the maximum set by a FATE module 42. If neither condition is satisfied, nothing is done. The new bitrate is sent to the video encoder in APP layer 44 at step 68, and the module sleeps for a predetermined amount of time at step 69. The specific way in which FATE module 42 and CWA module 43 uses its inputs and calculates its outputs is detailed in the next two sections.

Cross-Layer Fair Airtime Throughput Estimation

There are several ways to evaluate per-station and system throughput in IEEE 802.11 networks. Based on framing and timing details in standards, theoretical maximum throughput can be calculated assuming no channel or collision errors. With errors, a Markovian model can be applied to model the throughput in a multirate deployment. Given information such as wireless error rate, transmission rate, and backoff parameters for all stations, one can solve a system of nonlinear equations for transmission probabilities in order to compute estimates of system and per-station throughput.

However, in a real multi-camera setting, one does not have the distributed access of all this information, nor is there the computation power for accurate modeling and equation solving. Therefore, according to an embodiment of the invention, a cost efficient scheme for per-station throughput evaluation is proposed. Any device that is capable of counting its frame errors and has information about the total number of stations in its BSS can implement a proposed formula according to an embodiment of the invention.

Assume $G_{max}^i$ is the theoretical maximum throughput as seen by station i, computed using $\bar{f}$ (average MSDU size) and $r_i$ (STA i's PHY rate):

$$G_{max}^i = \frac{MSDU\ Size}{Delay\ per\ MSDU} \quad (5)$$

$$= \frac{\bar{f}}{T_{DIFS} + T_{SIFS} + T_{BO} + T_{ACK} + T_{DATA}},$$

with delay components explained in Table II, shown in FIG. 5. The Preamble+PLCP in Table II is the time for the PLCP (Physical Layer Convergence Protocol) to perform physical synchronization with the transmitted signal, while $\sigma$ in the definition of $T_{DIFS}$ refers to the slot time, defined above. The rate, $r_i$, enters EQ. (5) implicitly in the parameter $T_{data}$, which is computed as the data size (in bits) divided by the rate, $r_i$ (bits per second) to yield $T_{data}$ (seconds). Exploiting the throughput version of WLAN airtime (proportional) fairness, one can define $G_o^i$ as actual throughput of station i in an error free channel. The portion for airtime consumed can be represented as $$\frac{G_o^i}{G_{MAX}^i}.$$

Then, applying the airtime fairness criteria:

$$\sum_{i=1}^{N} \frac{G_o^i}{G_{MAX}^i} = 1, \quad (6)$$

$$\frac{G_o^i}{G_{MAX}^i} = \frac{G_o^j}{G_{MAX}^j}, \forall\ i, j,$$

one obtains $$G_o^i = \frac{1}{N} G_{MAX}^i \qquad (7)$$

when airtime fairness is achieved, where N is the number of stations. EQ. (7) confirms that, given a fixed number of stations, the throughput of one station is independent of the data rates used by other stations. A next step is to compensate for the effect of errors due to the frame error rate (FER) at each station, $p_f^i$, by estimating the portion of frames successfully transmitted in a given amount of airtime share. Since collision rate is low, one can discount the throughput estimate by $p_f^i$, and the estimated throughput is:

$$G_e^i \approx G_o^i \cdot (1 - p_f^i) = \frac{1}{N} \cdot G_{MAX}^i \cdot (1 - p_f^i). \qquad (8)$$

The observations, $\bar{f}$, $r_i$, and $p_f^i$, are evaluated at a fixed interval (e.g., every 100 ms) and used to re-compute $G_e^i$. The result is then passed to the SRA module, as indicated by the arrow labeled "Max Throughput" in FIG. 4 and the condition on $G_e$ shown in FIG. 6. The SRA module updates the APP video encoder with target bitrate every $\epsilon$ time. The rate goes down if PLR is larger than threshold $\eta_1$; goes up if lower than $\eta_2$ for t consecutive time intervals. The average estimated throughput, $\overline{G_e^i}$, is calculated from $G_e^i$ samples over $\epsilon$ time and applied after adjusted by tolerable error $\eta_1$. The encoder capability in terms of maximum rate $V_{max}$, minimum rate $V_{min}$, and step size $\delta$ are also considered. There is no explicit formula for how $V_{max}$, $V_{min}$ and the step size $\delta$ are used. According to an embodiment of the invention, the step size refers to the size of the increment used to change the bitrates, $V_{min}$ refers to the minimum bitrate being used, and $V_{max}$ was the maximum bitrate. Exemplary, non-limiting values for $V_{max}$, $V_{min}$ are 200 kbps and 800 kbps, respectively.

Consequently, a FATE according to an embodiment of the invention enables airtime fairness via an SRA process and is a sufficient solution under a static channel (without PHY rate changes). As mentioned earlier, the 5-10 second delay required by the APP video encoder to "catch up" to the new target bitrate is too long. If there is a change in the PHY rate, the system could easily suffer catastrophic failure during the transition period. In the next subsection, it is shown how CWA is used to provide stability during these transition periods.

Contention Window Adaptation

The CWA module computes the appropriate $CW_{min}$ for each data frame immediately before the frame enters the backoff process. The computation uses the PHY rate as an input, and computes its output by using an abstraction of EQ (4). Namely, let the right hand side of EQ. (4) be equal to a constant, $r_{max} \cdot CW_{min}^o$, where $r_{max}$ and $CW_{min}^o$ are the maximum PHY rate and initial $CW_{min}$ value, respectively. Then, the left hand side is divided by $r_i$ to get target $CW_{min}$ of the $i^{th}$ camera. Thus:

$$CW_{min}^i = \min\{\lfloor c_i \cdot CW_{min}^o \rfloor, CW_{max}\}, \qquad (9)$$

where $c_i = r_{max}/r_i$. $CW_{max}$ is the absolute maximum contention window size that can be used by a wireless 802.11 station to contend for the channel. It is defined in the 802.11 standard ANSI/IEEE Std 802.11, "Part 11: Wireless LAN Medium Access Control (MAC) and Physical Layer (PHY) Specifications," 1999, and defines the maximum number of slot times that the station could wait (backoff) before it tries to access the channel again.

$CW_{min}$ is set inversely proportional to the PHY rate. Thus, stations using low channel rates due to degraded signal quality have a lower probability to transmit than high-rate stations. Statistically, equal data airtime share among stations is maintained under this adaptation. This implementation guarantees QoS according to a set of requirements and also releases congestion on channel utilization time, and thus it addresses the issue of determining the available bandwidth discussed above.

Performance Evaluation

Next, a family of congestion control algorithms according to embodiments of the invention are evaluated via both simulation and experimentation based on their improvement in PLR, throughput, and reliability, and ultimately show that CLC exhibits the best performance.

Simulation and Experimental Setups

A real-world experimental setup is based on a wireless, real-time, surveillance/security system. The following scenario is considered: Six to seven Axis 207w cameras stream video (100 kbps-800 kbps Constant Bitrate MPEG4/RTP) wirelessly (802.11b) to a central security server (a Dell OptiPlex GX280) via a wireless access point (Siemens AP2630). The GX280 processes the video in real-time to perform actions such as: face detection, person tracking, forbidden zone detection, etc. System statistics were monitored in real-time using custom plugins for AiroPeek SE. The distributed cross-layer control algorithms were implemented on the cameras using shell scripts written for the Linux kernel running on each camera.

Table III, shown in FIG. 7, presents a list of the multirate scenarios under consideration. The scenarios are described by the number of low rate stations in the BSS. There are three scenarios each for N=6 and N=7, giving a total of 6 scenarios. The various solutions that were implemented are displayed in Table IV, shown in FIG. 8. The number of cameras was set to $N \in \{6, 7\}$ so there are 3 scenarios each for N=6 and N=7, for a total of 2×3=6 multirate scenarios. The values $N \in \{6, 7\}$ were chosen empirically so that N=6 brings the off-the-shelf system close to saturation and N=7 brings the system just over saturation. Observations also show that: 0 (ideal channel) $<p_e<0.2$.

Table V, shown in FIG. 9 displays the network configuration for the various layers. The experimental procedure was as follows: First, each camera was configured to use MPEG4 as shown in FIG. 9 with initial constant target bitrate 800 kbps. Then, each camera was programmed with one of the four algorithms listed in Table IV, and one of the six multirate scenarios listed in FIG. 7 was selected and run for 30 seconds while the cameras streamed video to the server. Additional experiments were conducted where the first 15 seconds used one multirate scenario, and the last 15 seconds used a different multirate scenario (to study PHY rate transitions in real-time).

The NS2 simulations were utilized, which were designed to match the real scenarios just described. Theories were first validated with NS2 tests, and then real experiments were used to test feasibility of implementation and performance under real conditions.

Basic Comparison of Solutions Under Test

The performance of all four control algorithms listed in FIG. 8 was evaluated vis-a-vis the following experiment: At t=0, N=6 stations are at the "All High" scenario, then at t=15 sec., there is a transition to the "Three Rates" scenario. Typical values of the SRA parameters are $\eta_1=5\%$, $\eta_2=3\%$, $\delta=100$ kbps, t=3 sec., $\epsilon=1$ sec. For clarity, only simulation results are shown, and the only results reported are from a randomly selected fast (11 Mbps) station and a randomly selected slow (2 Mbps) station.

FIGS. 10(a)-(d) summarizes the results of the comparison in terms of throughput and packet loss (PLR) at the two selected STAs. The scenario is N=6, All High for the first 15 seconds and then transition to Three Rates for the last 15 seconds. In each of the figures, curve 101 represents the raw CBR result, curve 102 represents the blind SRA result, curve 103 represents the smart SRA result, and curve 104 represents the result of a CDC method according to an embodiment of the invention. The Throughput and PLR are given for all four different control algorithms for an 11 Mbps station (FIGS. 10(a) and (c), respectively) and a 2 Mbps station (FIGS. 10(b) and (d), respectively). As expected, the CBR approach performs the worst since it is simply the out-of-the-box approach to uplink video without any adaptation. It yields the highest PLR and lowest throughput in both the 11 Mbps and 2 Mbps STAs.

The Blind SRA algorithm shows a mild improvement in terms of PLR in both stations. Notice the sharp decrease in throughput at the high rate STA (FIG. 10(a)) immediately after the transition to "Three Rates". This is because Blind SRA operates using throughput fairness, so the presence of a low-rate STA causes the throughput of every STA in the BSS to converge toward that of the lowest rate STA. If this throughput is less than the minimum needed to sustain the video (800 Kbps), then the STA will suffer high packet loss. Indeed, in this experiment the throughput converges to about 350 Kbps (c.f. FIG. 11, below), and consequently, there is corresponding jump in PLR in both 11 Mbps ((FIG. 5(c)) and 2 Mbps (FIG. 10(d)) STAs. The spike will go away as the SRA algorithm reacts to the high packet loss by reducing the target bitrate of the video. However, as PLR transiently improves, Blind SRA will increase the target bitrate without regard for the current PHY rate or other STAs in the BSS. Eventually, the target bitrate will be increased beyond what the channel can accommodate (possibly even all the way back to the maximum target of 800 Kbps), and thus producing oscillations in PLR and Throughput.

The Smart SRA algorithm demonstrates an improvement in both PLR and throughput. It enhances Blind SRA by upper-bounding the throughput in SRA via FATE, thus eliminating oscillations and promoting airtime fairness. The drawback of Smart SRA is that it operates at a slower time scale, so it is unstable during PHY rate transitions. Indeed, in FIG. 10(a), there is a temporary drop in throughput (and a corresponding spike in PLR (FIG. 10(c)) immediately after the transition to the "Three Rates" scenario.

A CLC algorithm (SRA+FATE+CWA) according to an embodiment of the invention demonstrates the best overall performance. It inherits the benefits of Smart SRA, plus it eliminates the instability during transition periods by doing CW adaptation (which has a quick response). The throughput performance of CLC versus Blind SRA will now be detailed. Table VI, shown in FIG. 11 compares the simulation average throughput in KBPS of Blind SRA and CLC for three scenarios in simulation, with N=6, $p_e$=0.2, and the initial video target bitrate=800 KBPS. A CLC yields a higher aggregate and per-station throughput than Blind SRA because it uses FATE plus CWA to ensure airtime fairness, and hence the presence of low-rate stations does not penalize the performance of high-rate stations.

To validate these claims and results, data from real experiments is used. FIGS. 12(a)-(b) compares the aggregate throughput for various scenarios under Blind SRA and CLC for both simulation and real experiments. In the bar graph pairs of FIGS. 12(a)-(b), the left bar represents the Blind SRA result, and the right bar represents the results of a CLC method of an embodiment of the invention. The figures show a reasonable correspondence between results obtained from simulation (FIG. 12(a)) and from real experiments (FIG. 12(b)). In addition, as the channel moves closer to its capacity limits (increasing N), and as the variation in PHY rates among the stations increases, the relative performance of CLC over Blind SRA grows. In fact, for the most challenging scenario (N=7, Three Rates), illustrated in FIG. 13(a)-(b), the aggregate throughput observed in the real experiment is nearly doubled (from 1.75 Mbps to 3.35 Mbps), thus expanding the effective capacity of the system for higher bitrates and/or more cameras. This is evidence that airtime fairness is preferred to throughput fairness in multirate wireless video transport systems.

To determine the exact reason why airtime fairness results in more efficient use of the bandwidth than throughput fairness, the per-station throughput from a real experiment during the "Three Rates" scenario using Blind SRA and CLC for N=7. The results are illustrated in FIGS. 13(a)-(b). For clarity, results are reported from a randomly selected ("representative") station at each PHY rate. In FIGS. 13(a)-(b), curve 131 represents the 11 Mbps result, curve 132 represents the 5.5 Mbps result, and curve 133 represents the 2 Mbps result. The blind SRA throughput is illustrated in FIG. 13(a). The layered throughput seen in FIG. 13(b), is due to CLC's airtime fairness policy, which forces per-station throughput to be proportional to the station's maximum attainable throughput as determined by FATE. The effect of this layering is that slow stations never try to use more of the channel than they can actually handle given their PHY rate, thus providing more airtime to fast stations, and ultimately increasing the aggregate throughput. Thus, the use of CLC induces airtime fairness. This is the reason that the per-station throughput is layered proportional to the station's PHY rate. As evidenced in the aggregate throughput plots, this layering ultimately results in increased aggregate throughput.

Packet loss rate (PLR) is another factor for video quality. It is worthwhile looking at its raw value across time and space. FIGS. 14(a)-(b) illustrates the packet loss rate for Blind SRA vs. CLC using data is from real experiments, with an N=7 scenario with three rates. In FIGS. 14(a)-(b), curves 141, 142, 143, 144, 145, 146, and 147 represents results from cameras 1, 2, 3, 4, 5, 6, and 7, respectively. For clarity, only the results from cameras 1-4 are shown in FIG. 14(b). The use of SRA ensures that every station sets its target bitrate in a way that minimizes packet loss, and the use of FATE in conjunction with SRA ensures that airtime fairness is maintained. Under this regime, packet loss is drastically reduced.

Indeed, PLR is reduced in CLC. In fact, for some cameras (5, 6, and 7), packet loss is completely eliminated for the duration of the experiment. In contrast, Blind SRA suffers from both jagged behavior as well as sustained periods of packet loss. It is thus clear that CLC offers improvement in PLR performance, and hence, quality.

Join of Stations

Changing the wireless camera deployment (e.g. new cameras joining the BSS) may lead to sudden congestion. Again, performance is compared under various adaptation schemes. The scenario is setup according to the previous results where N=6, 7 is the maximum limit at which the system can sustain high quality video at the 11 Mbps stations. The test begins with N=6, and after 15 seconds, a new 11 Mbps PHY station joins the BSS. Observations are focused on both the average quality during first 15 seconds and also on the behavior of each scheme around the transition point (the 15th second).

For advanced quality comparison, video clips from real indoor surveillance are used. Scenes with employees walking by (i.e. a proper amount of motion) were selected to avoid unexpected high quality due to static scenes. Then, the objective video quality was evaluated using PSNR as a performance metric.

Figure 15:
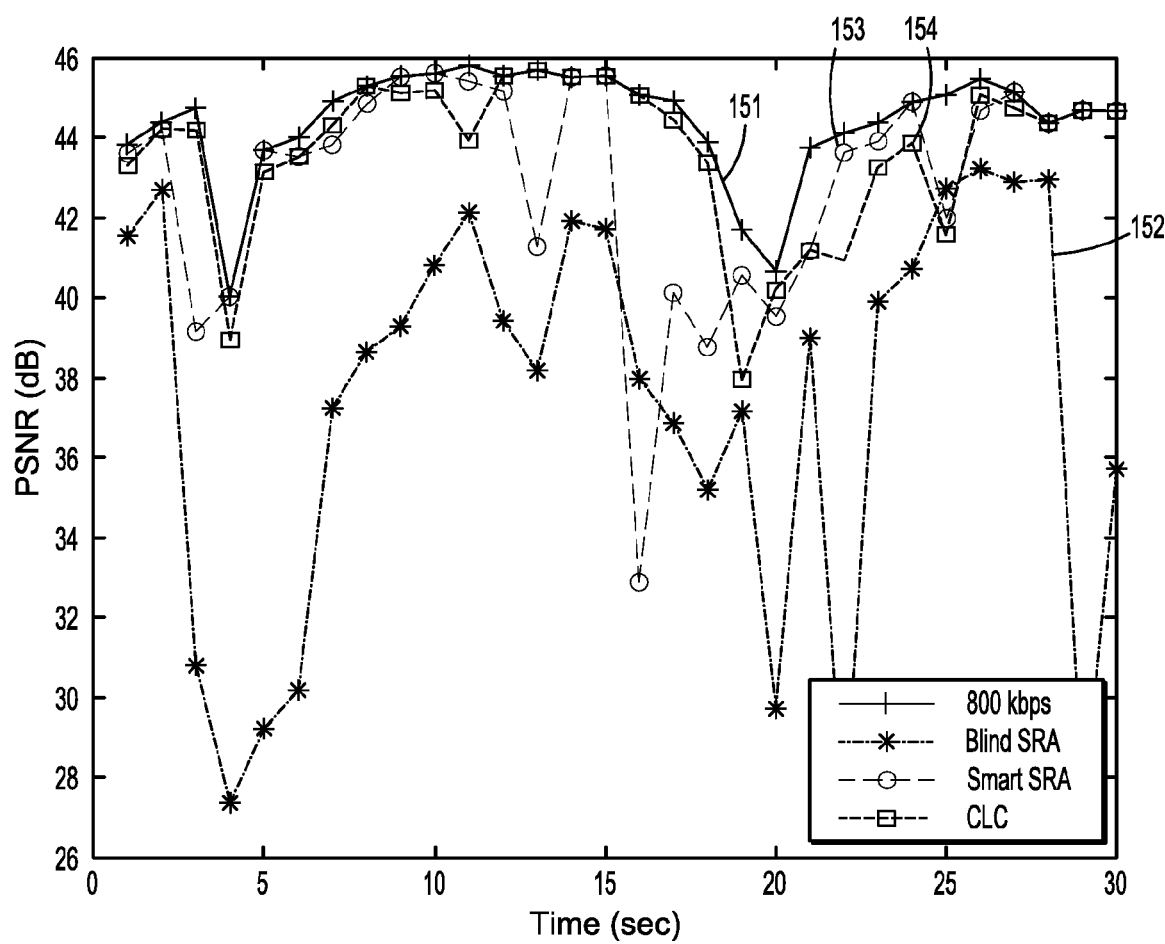
FIG. 15 is a graph of representative PSNR at 11 Mbps station, according to an embodiment of the invention.

FIG. 15, illustrates a representative PSNR at 11 Mbps station for testing the case where stations join the BSS at 15 second. During the transition period (15 sec. to 20 sec.), there is a significant drop of more than 10 dB in PSNR under Smart SRA, while CLC stays within 4 dB of the ideal PSNR curve. The four curves shown in FIG. 9 are representative curves randomly selected from one of the 11 Mbps stations. Curve 151 is a baseline showing the best possible quality for 800 kbps video under perfect conditions. Curves 152, 153, and 154 represent the Blind SRA, Smart SRA, and CLC results, respectively.

Prior to the joining of a new station, both Smart SRA and CLC are able to provide good quality close to the ideal case. Blind SRA is the only scheme that suffers low video quality due to lower throughput and higher PLR. Around the transition period (15 sec-20 sec), Smart SRA suffers a drop of more than 10 dB in PSNR, while CLC stays within 4 dB of the ideal PSNR curve.

Thus, the effectiveness of a CLC framework according to an embodiment of the invention has been demonstrated when new stations join the BSS. This test also illustrates that source rate adaptation by itself is not enough; CWA is needed during transition regions.

Robustness Under Link Adaptation

In a final test, the varying channel quality and dynamic PHY rate selection by suboptimal rate adaptation schemes found in today's off the shelf equipment is examined.

This part of the examination is only performed in verified NS2 implementation to fully control the channel quality and link adaptation scheme for better analysis. The link quality is simulated by the received SNR at the access point. The received bit error rate (BER) can then be obtained according to reference chip specifications. With respect to the link adaptation scheme, an Adaptive Auto Rate Fallback (AARF) method was implemented instead of testing the proprietary scheme embedded in the wireless cameras.

Video quality is compared under various channel qualities (SNR=13, 9, 5 dB shown in curves 162, 163, and 164 respectively) against a baseline 800 kbps video (curve 161) with perfect link condition. FIGS. 16(a)-(b) illustrates the PSNR results for two schemes: Smart SRA (FIG. 16(a)) and CLC (FIG. 16(b)). A CLC according to an embodiment of the invention provides a better average PSNR, and Smart SRA suffers more frequent and sharp drops in PSNR. This indicates that reacting to frequent PHY rate transitions based solely on a slower time scale at the APP layer is not sufficient—even with FATE bandwidth bounds. On the other hand, as shown in FIG. 16(b), a CLC PSNR curve closely tracks the ideal 800 kbps curve. Furthermore, there is more quality gain among the lowest tiers of link quality (5 dB and 9 dB SNR) when using a CLC according to an embodiment of the invention. As expected, CWA combined with Smart SRA has the power to overcome the aforementioned obstacles associated with real-time uplink video over WLAN.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 17:
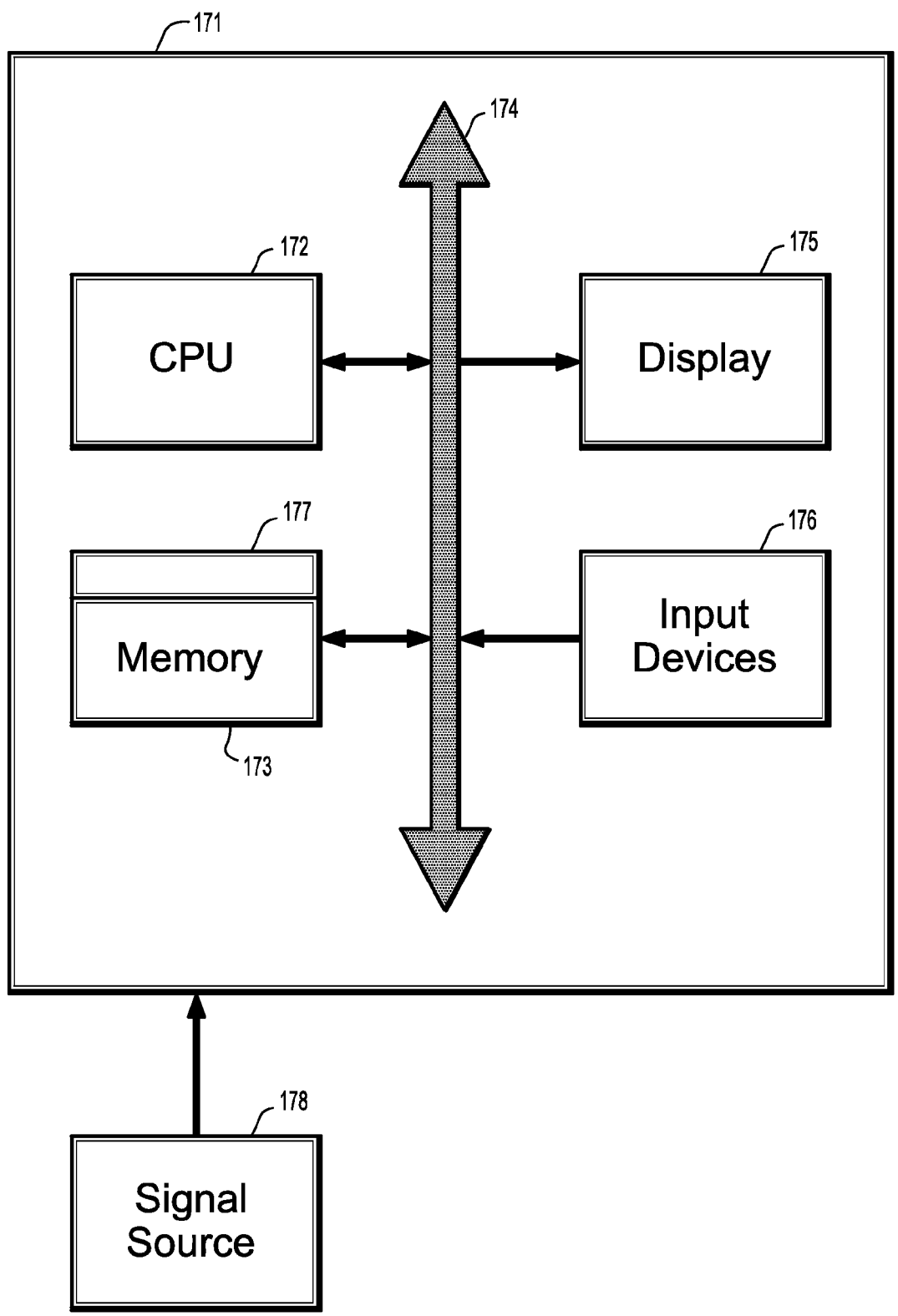
FIG. 17 is a block diagram of an exemplary computer system for implementing a method for cross-layer congestion control for video transmission over wireless local area networks, according to an embodiment of the invention.

FIG. 17 is a block diagram of an exemplary computer system for implementing a method and system for cross-layer congestion control for video transmission over wireless local area networks, according to an embodiment of the invention. Referring now to FIG. 17, a computer system 171 for implementing the present invention can comprise, inter alia, a central processing unit (CPU) 172, a memory 173 and an input/output (I/O) interface 174. The computer system 171 is generally coupled through the I/O interface 174 to a display 175 and various input devices 176 such as a mouse and a keyboard. The support circuits can include circuits such as cache, power supplies, clock circuits, and a communication bus. The memory 173 can include random access memory (RAM), read only memory (ROM), disk drive, tape drive, etc., or a combinations thereof. The present invention can be implemented as one or more routines 177 that are stored in memory 173 and executed by the CPU 172 to process the signal from the signal source 178. As such, the computer system 171 is a general purpose computer system that becomes a specific purpose computer system when executing the routines 177 of the present invention.

The computer system 171 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for controlling congestion for real-time video transmission in a wireless network connecting a plurality of video cameras to a central server, said method comprising the steps of:
   receiving a packet loss rate of a video camera in a wireless network;
   receiving an estimated maximum throughput of said video camera from said camera to a server;
   decrementing a bit transmission rate when said packet loss rate is greater than a first predetermined threshold;
   incrementing said bit transmission rate when said packet loss rate is less than a second predetermined threshold for a predetermined time period; and
   transmitting said bit transmission rate to a video encoder that is part of an application layer of a network communication protocol for said wireless network.

2. The method of claim 1, wherein said packet loss rate is received from a media access control layer of said network communication protocol.

3. The method of claim 2, wherein said estimated maximum throughput is received from a fair airtime throughput estimator.

4. The method of claim 3, comprising calculating said estimated maximum throughput from $$G_e \approx \frac{1}{N} \cdot G_{MAX} \cdot (1 - p_f),$$

wherein $G_{max}$ is a theoretical maximum throughput of said video camera, N is a number of cameras in said network, and $p_f^i$ is an estimated portion of video frames successfully transmitted in a given amount of airtime share.

5. The method of claim 4, wherein $p_f^i$ is calculated from a frame error rate received from said media access control layer.

6. The method of claim 2, further comprising receiving at a contention window adaptation module said bit transmission rate from said media access control layer, calculating a contention window size from $$CW_{min}^i = \min\left\{ \left\lfloor \frac{r_{max}}{r_i} \cdot CW_{min}^o \right\rfloor, CW_{max} \right\},$$

wherein $r_{max}$ is a maximum PHY bitrate for said camera, $r_i$ is an actual PHY bitrate for said camera received from said media access control layer, $CW_{min}^o$ is an initial contention window size for said camera, and $CW_{max}$ is a maximum contention window size, and sending said contention window size to said media access control layer.

7. The method of claim 6, wherein said contention window size is calculated for each video data frame immediately before said frame enters a backoff process.

8. The method of claim 3, further comprising calculating an average estimated maximum throughput from a plurality of estimated maximum throughputs received from said fair airtime throughput estimator, and incrementing said bit transmission rate when a sum of said bit transmission rate and an increment amount is less than or equal to $$\min\left\{ \overline{G_e^i} \cdot \frac{1}{1 - \eta_1}, V_{max} \right\},$$

wherein $\overline{G_e^i}$ is the average estimated maximum throughput, $\eta_1$ is said first predetermined threshold, and $V_{max}$ is a maximum transmission rate.

9. The method of claim 1, further comprising decrementing said bit transmission rate when bit transmission rate is greater than or equal to a minimum bit transmission rate plus a decrement amount.

10. A method for controlling congestion for real-time video transmission in a wireless network connecting a plurality of video cameras to a central server, said method comprising the steps of:
receiving a frame error rate of a video camera in a wireless network from a media access control layer of a network communication protocol for said wireless network;
receiving a bit transmission rate from said media access control layer;
receiving a number of cameras in said network;
calculating an estimated maximum throughput of said video camera from said frame error rate, said bit transmission rate, and said number of cameras;
sending said estimated maximum throughput to a source rate adaptation module for adjusting said bit transmission rate;
calculating a contention window size from said bit transmission rate; and
sending said contention window size to said media access control layer, wherein said contention window size maintains network airtime fairness.

11. The method of claim 10, wherein adjusting said bit transmission rate comprises:
receiving a packet loss rate of said video camera from media access control layer;
decrementing said bit transmission rate when said packet loss rate is greater than a first predetermined threshold;
incrementing said bit transmission rate when said packet loss rate is less than a second predetermined threshold for a predetermined time period; and
transmitting said bit transmission rate to a video encoder that is part of an application layer of said network communication protocol.

12. The method of claim 10, wherein said estimated maximum throughput of said video camera is calculated from $$G_e \approx \frac{1}{N} \cdot G_{MAX} \cdot (1 - p_f),$$

wherein $G_{max}$ is a theoretical maximum throughput of said video camera, N is a number of cameras in said network, and $p_f^i$ is an estimated portion of video frames successfully transmitted in a given amount of airtime share determined from said frame error rate received from said media access control layer.

13. The method of claim 10, wherein said contention window size is calculated from $$CW_{min}^i = \min\left\{ \left\lfloor \frac{r_{max}}{r_i} \cdot CW_{min}^o \right\rfloor, CW_{max} \right\},$$

wherein $r_{max}$ is a maximum PHY bitrate for said camera, $r_i$ is an actual PHY bitrate for said camera received from said media access control layer, $CW_{min}^o$ is an initial contention window size for said camera, and $CW_{max}$ is a maximum contention window size.

14. The method of claim 11, further comprising calculating an average estimated maximum throughput from a plurality of estimated maximum throughputs received from a fair airtime throughput estimator, and incrementing said bit transmission rate when a sum of said bit transmission rate and an increment amount is less than or equal to $$\min\left\{ \overline{G_e^i} \cdot \frac{1}{1 - \eta_1}, V_{max} \right\},$$

wherein $\overline{G_e^i}$ is the average estimated maximum throughput, $\eta_1$ is said first predetermined threshold, and $V_{max}$ is a maximum transmission rate.

15. The method of claim 11, further comprising decrementing said bit transmission rate when bit transmission rate is greater than or equal to a minimum bit transmission rate plus a decrement amount.

16. A program storage device readable by a computer, tangibly embodying a program of instructions executable by the computer to perform the method steps for controlling congestion for real-time video transmission in a wireless network connecting a plurality of video cameras to a central server, said method comprising the steps of:

receiving a packet loss rate of a video camera in a wireless network;

receiving an estimated maximum throughput of said video camera from said camera to a server;

decrementing a bit transmission rate when said packet loss rate is greater than a first predetermined threshold;

incrementing said bit transmission rate when said packet loss rate is less than a second predetermined threshold for a predetermined time period; and transmitting said bit transmission rate to a video encoder that is part of an application layer of a network communication protocol for said wireless network.

17. The computer readable program storage device of claim 16, wherein said packet loss rate is received from a media access control layer of said network communication protocol.

18. The computer readable program storage device of claim 17, wherein said estimated maximum throughput is received from a fair airtime throughput estimator.

19. The computer readable program storage device of claim 18, the method comprising calculating said estimated maximum throughput from $$G_e \approx \frac{1}{N} \cdot G_{MAX} \cdot (1 - p_f),$$

wherein $G_{max}$ is a theoretical maximum throughput of said video camera, N is a number of cameras in said network, and $p_f^i$ is an estimated portion of video frames successfully transmitted in a given amount of airtime share.

20. The computer readable program storage device of claim 19, wherein $p_f^i$ is calculated from a frame error rate received from said media access control layer.

21. The computer readable program storage device of claim 17, the method further comprising receiving at a contention window adaptation module said bit transmission rate from said media access control layer, calculating a contention window size from $$CW_{min}^i = \min\left\{\left\lfloor \frac{r_{max}}{r_i} \cdot CW_{min}^o \right\rfloor, CW_{max}\right\},$$

wherein $r_{max}$ is a maximum PHY bitrate for said camera, $r_i$ is an actual PHY bitrate for said camera received from said media access control layer, $CW_{min}^o$ is an initial contention window size for said camera, and $CW_{max}$ is a maximum contention window size, and sending said contention window size to said media access control layer.

22. The computer readable program storage device of claim 21, wherein said contention window size is calculated for each video data frame immediately before said frame enters a backoff process.

23. The computer readable program storage device of claim 18, the method further comprising calculating an average estimated maximum throughput from a plurality of estimated maximum throughputs received from said fair airtime throughput estimator, and incrementing said bit transmission rate when a sum of said bit transmission rate and an increment amount is less than or equal to $$\min\left\{\overline{G_e^i} \cdot \frac{1}{1-\eta_1}, V_{max}\right\},$$

wherein $\overline{G_e^i}$ is the average estimated maximum throughput, $\eta_1$ is said first predetermined threshold, and $V_{max}$ is a maximum transmission rate.

24. The computer readable program storage device of claim 16, the method further comprising decrementing said bit transmission rate when bit transmission rate is greater than or equal to a minimum bit transmission rate plus a decrement amount.

* * * * *